US008705087B2

(12) United States Patent　　(10) Patent No.:　　US 8,705,087 B2
Tao　　(45) Date of Patent:　　Apr. 22, 2014

(54) IMAGE FORMING APPARATUS AND IMAGE FORMING METHOD FOR ROTATING IMAGE DATA

(75) Inventor: Kozo Tao, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 805 days.

(21) Appl. No.: 12/615,431

(22) Filed: Nov. 10, 2009

(65) Prior Publication Data

US 2010/0188691 A1　　Jul. 29, 2010

(30) Foreign Application Priority Data

Jan. 29, 2009　(JP) ................................. 2009-018681
Jan. 29, 2009　(JP) ................................. 2009-018682

(51) Int. Cl.
*G06F 3/12*　　(2006.01)

(52) U.S. Cl.
USPC ........ 358/1.15; 358/1.12; 358/1.18; 400/582; 715/200

(58) Field of Classification Search
USPC ............. 358/1.1, 1.11, 1.12, 1.13, 1.15, 1.16, 358/1.18, 1.2, 3.24, 448, 490; 271/186, 271/9.06; 345/649; 348/207.2; 382/1.12; 399/407, 410, 81, 82; 400/582; 715/200

See application file for complete search history.

(56) References Cited

U.S. PATENT DOCUMENTS

| 5,515,481 | A * | 5/1996 | Pardo ........................... 358/1.18 |
| 6,206,360 | B1 * | 3/2001 | Urata et al. .................. 271/9.06 |
| 6,320,667 | B1 * | 11/2001 | Mitsuhashi .................... 358/1.1 |
| 6,343,197 | B1 * | 1/2002 | Serizawa et al. ................ 399/82 |
| 6,453,133 | B1 * | 9/2002 | Osari et al. ...................... 399/82 |
| 6,456,732 | B1 * | 9/2002 | Kimbell et al. ................ 382/112 |
| 2003/0197882 | A1 * | 10/2003 | Tsukuba et al. ............. 358/1.12 |
| 2005/0200896 | A1 * | 9/2005 | Narusawa et al. ........... 358/1.18 |
| 2005/0207812 | A1 * | 9/2005 | Miyazaki ...................... 399/407 |
| 2006/0210337 | A1 * | 9/2006 | Nagata et al. ................. 399/407 |
| 2007/0057430 | A1 * | 3/2007 | Yamazaki .................... 271/9.13 |
| 2008/0002230 | A1 * | 1/2008 | Sakaue ......................... 358/3.24 |

FOREIGN PATENT DOCUMENTS

| JP | 05-270097 | | 10/1993 |
| JP | 06008548 | A * | 1/1994 |
| JP | 06-086050 | | 3/1994 |
| JP | 09-127742 | | 5/1997 |
| JP | 09-247475 | | 9/1997 |
| JP | 2002-330277 | | 11/2002 |

* cited by examiner

*Primary Examiner* — David S Cammack
(74) *Attorney, Agent, or Firm* — K&L Gates LLP

(57) ABSTRACT

An image forming apparatus includes an image data conversion unit configured to convert print data into bitmap data, a sheet feeding unit configured to store and feed a sheet on which printing is to be performed, a detecting unit configured to detect an orientation of the sheet in the sheet feeding unit, a print unit configured to print the bitmap data onto the sheet fed from the sheet feeding unit, a determination unit configured to determine whether or not a data orientation in which pieces of pixel data of the bitmap data are arranged matches the sheet orientation detected by the detecting unit, and an image rotating unit configured to rotate the bitmap data when the determination unit determines that the data orientation does not match the sheet orientation, whereby the data orientation matches with the sheet orientation.

8 Claims, 6 Drawing Sheets

IMAGE FORMING APPARATUS AND IMAGE FORMING METHOD FOR ROTATING IMAGE DATA

INCORPORATION BY REFERENCE

This application is based upon and claims the benefit of priority from the corresponding Japanese Patent application No. 2009-018681, filed Jan. 29, 2009, and No. 2009-018682, filed Jan. 29, 2009, the entire contents of which are incorporated herein by reference.

BACKGROUND

1. Field of the Invention

The present invention relates to rotating image data to be printed in an image forming apparatus.

2. Description of the Related Art

In a typical image forming apparatus, print data is bitmapped so as to match the orientation of sheets housed in a sheet cassette. Bitmap data is generated such that pieces of data to be delivered to a print engine are arranged in order in the main scanning direction and repeatedly in the sub-scanning direction.

In some situations, however, the orientation of the generated bitmap data does not match the orientation of the sheets in the sheet cassette. For example, after the generation of bitmap data, sheets in the desired sheet cassette may be used up or the sheets may be unavailable due to the occurrence of a problem, such as a sheet jam. Consequently, another sheet cassette may be selected in which sheets are oriented in a different direction. To perform printing in such a situation, rendering of the data (conversion of print data into image data) needs to be started over again, requiring extra time for performing such process.

SUMMARY

According to an embodiment of the present invention, an image forming apparatus is provided that includes an image data conversion unit configured to convert print data into bitmap data, a detecting unit configured to detect an orientation of the sheet in a sheet feeding unit, a print unit configured to print the bitmap data resulting from the conversion by the image data conversion unit onto the sheet fed from the sheet feeding unit, a determination unit configured to determine whether or not a data orientation in which pieces of pixel data of the bitmap data are arranged matches the sheet orientation detected by the detecting unit, and an image rotating unit configured to rotate the bitmap data when the determination unit determines that the data orientation does not match the sheet orientation.

According to another embodiment of the present invention, an image forming apparatus is provided that includes an image data conversion unit configured to convert print data into bitmap data, a detecting unit configured to detect an orientation of a sheet in a sheet feeding unit, a print unit configured to print the bitmap data resulting from the conversion by the image data conversion unit onto the sheet fed from the sheet feeding unit, a determination unit configured to determine whether or not a data orientation in which pieces of pixel data of the bitmap data are arranged matches the sheet orientation detected by the detecting unit, and a display panel unit configured to display a message requesting that the sheets be placed in an orientation matching the data orientation, when the determination unit determines that the data orientation does not match the sheet orientation.

According to yet another embodiment of the present invention, an image forming method is provided that includes the steps of converting print data into bitmap data, detecting an orientation of a sheet in a sheet feeding unit, determining whether or not a data orientation in which pieces of pixel data of the bitmap data resulting from the converting step are arranged matches the sheet orientation detected in the detecting step, rotating the bitmap data when it is determined that the data orientation does not match the sheet orientation, whereby the data orientation is matched with the sheet orientation, and printing the bitmap data onto the sheet fed from the sheet feeding unit.

Additional features and advantages are described herein, and will be apparent from the following Detailed Description and the figures.

DETAILED DESCRIPTION

In an image forming apparatus according to an embodiment of the present invention, a determination unit determines whether or not the orientation of generated bitmap data matches the expected orientation of a sheet on which printing is to be performed. If the result of this determination shows that the two orientations do not match, an image rotating unit rotates the bitmap data by, for example, 90 degrees or 270 degrees.

Figure 1:
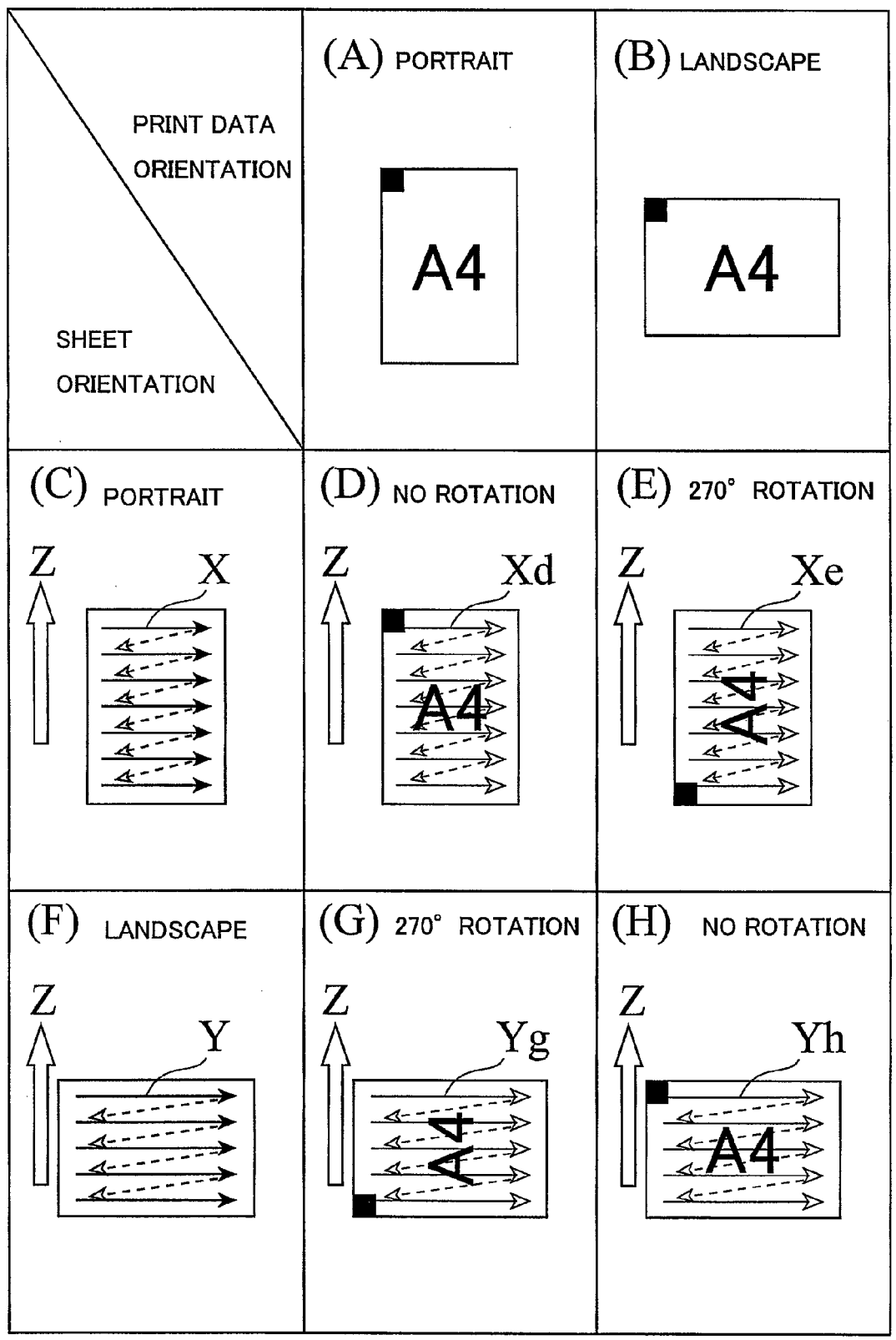
FIG. 1 illustrates the directions in which image data is generated in situations of different print data orientations and different sheet orientations.

FIG. 1 illustrates possible relationships between print data orientations and sheet orientations. Column (A) in FIG. 1 illustrates situations where print data is generated for an A4 sheet in a portrait orientation. Column (B) in FIG. 1 illustrates situations where print data is generated for an A4 sheet in a landscape orientation.

Rows (C) and (F) in FIG. 1 illustrate situations of respective sheet orientations in the sheet cassette to be used for printing in the image forming apparatus. Row (C) illustrates situations of portrait orientation in which the feed direction (represented by arrows Z) corresponds to the long-side direction of the sheet. Row (F) shows situations of landscape orientation in which the feed direction corresponds to the short-side direction of the sheet. In rows (C) and (F), the order in which pieces of image data are arranged, on the screen, is represented by arrows. A print engine renders the data by performing scanning in a direction (the main scanning direction) perpendicular to the feed direction, the scanning being repeated in the feed direction (the sub-scanning direction).

Pieces of bitmapped image data are arranged in order in the direction in which the rendering is performed. The order in which pieces of image data, i.e., pixel data, are arranged is represented by arrows X in row (C) and arrows Y in row (F).

Cell (D) in FIG. 1 illustrates a situation where the print data is in the portrait orientation and the sheet is fed in the portrait orientation. In this situation, the two orientations match each other. Therefore, image data is generated without rotating the print data and is delivered to a print unit. Then, printing is performed. The order in which the pieces of pixel data are arranged is represented by the arrows X.

Cell (E) in FIG. 1 illustrates a situation where the print data is in the landscape orientation and the sheet is fed in the portrait orientation. In this situation, the two orientations do not match each other. Therefore, the print data is rotated clockwise by 270 degrees (or 90 degrees) and is subsequently converted into image data. The image data that is generated is delivered to the print unit. Then, printing is performed. The order in which the pieces of pixel data are arranged is represented by the arrows X.

Cell (G) in FIG. 1 illustrates a situation where the print data is in the portrait orientation and the sheet is fed in the landscape orientation. In this situation, the two orientations do not match each other. Therefore, the print data is rotated clockwise by 270 degrees (or 90 degrees) and is subsequently converted into image data. The image data that is generated is delivered to the print unit. Then, printing is performed. The order in which the pieces of pixel data are arranged is represented by the arrows Y.

Cell (H) in FIG. 1 illustrates a situation where the print data is in the landscape orientation and the sheet is fed in the landscape orientation. In this situation, the two orientations match each other. Therefore, image data is generated without rotating the print data and is delivered to the print unit. Then, printing is performed. The order in which the pieces of pixel data are arranged is represented by the arrows Y.

In the image forming apparatus according to an embodiment, even if image data that is generated so as to match the orientation of the sheets in the sheet cassette later does not match the orientation of the sheets in the sheet cassette, printing can be continued by rotating the image data.

The configuration of the image forming apparatus will now be described.

Figure 2:
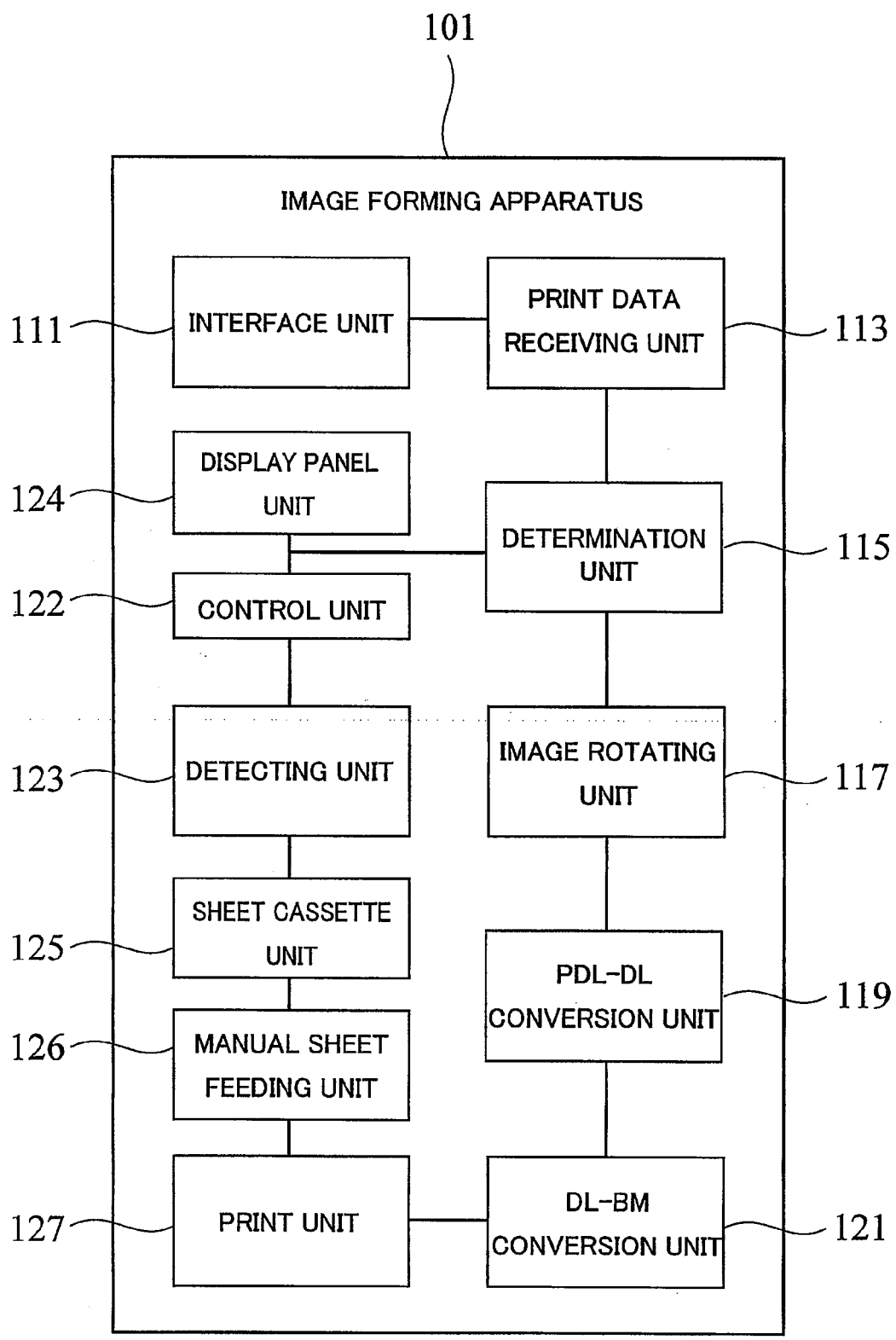
FIG. 2 is a functional block diagram of an image forming apparatus according to an embodiment of the present invention.

FIG. 2 is a functional block diagram of an image forming apparatus 101 according to an embodiment.

The image forming apparatus 101 includes the following functional blocks: an interface unit 111, a print data receiving unit 113, a determination unit 115, an image rotating unit 117, a PDL-DL conversion unit 119, a DL-BM conversion unit 121, a control unit 122, a detecting unit 123, a display panel unit 124, a sheet cassette unit 125, a manual sheet feeding unit 126, and a print unit 127.

The interface unit 111 is an interface that establishes a connection to a personal computer (PC) or the like. Print data that is generated by the PC is received through the interface unit 111.

The print data receiving unit 113 receives the print data through the interface unit 111 and stores the received print data. The print data is described in page description language (PDL).

The determination unit 115 determines whether or not the image data generated by the bitmap conversion of the print data, described in page description language, needs to be rotated relative to the orientation of the sheets in the sheet cassette that will be used for printing by the print unit 127.

The image rotating unit 117 rotates the image data if the determination unit 115 determines that the image data needs to be rotated. The angle of the rotation may be either 90 degrees or 270 degrees clockwise. The image rotating unit 117 is capable of high-speed image rotation by image rotation hardware.

The PDL-DL conversion unit 119 (an image data conversion unit) converts the print data, described in page description language, into display list (DL) described in an intermediate language.

The DL-BM conversion unit 121 (the image data conversion unit) converts the display list, i.e., the data in an intermediate language obtained by the foregoing conversion, into bitmap (BM) data, which is image data. The PDL-DL conversion unit 119 and the DL-BM conversion unit 121 constitute the image data conversion unit configured to convert print data into bitmap data.

The control unit 122 includes a central processing unit (CPU) and peripheral control circuits, and controls the entirety of the image forming apparatus 101. The control unit 122 detects the occurrence of any problem in the image forming apparatus 101 and the resolution of same. If printing can be continued after resolution, the control unit 122 causes the print unit 127 to continue printing.

The detecting unit 123 detects the size of the sheets stored in the sheet cassette unit 125, whether the sheets are in the portrait orientation (the long-side direction of the sheets corresponds to the feed direction) or in the landscape orientation (the short-side direction of the sheets corresponds to the feed direction), the number of sheets remaining in the sheet cassette, and the like.

The display panel unit 124 includes, for example, a liquid crystal display and displays to the user various pieces of information.

The sheet cassette unit 125 (a sheet feeding unit) stores the sheets to be fed to the print unit 127.

A manual sheet feeding unit 126 (the sheet feeding unit) is provided for manually feeding sheets to the print unit 127. The sheet cassette unit 125 and the manual sheet feeding unit 126 constitute the sheet feeding unit.

The print unit 127 includes a print engine and prints image data (bitmap data) onto a sheet.

The operation of the image forming apparatus 101 according to an embodiment will now be described with reference to flowcharts illustrated in FIGS. 3 and 4. The image forming apparatus 101 in the embodiment operates as follows. In step S11, print data is received by the print data receiving unit 113 through the interface unit 111 and stored.

In step S13, the determination unit 115 determines whether or not the image data needs to be rotated by comparing the orientation of the sheets in the sheet cassette detected by the detecting unit 123 and the orientation of the print data.

In step S15, if the result of the determination performed in step S13 shows that the image data needs to be rotated, the operation proceeds to step S17. If the result shows that the image data does not need to be rotated, the operation proceeds to step S16.

In step S16, the PDL-DL conversion unit 119 converts the received print data, i.e., page description language (PDL), into display list (DL), i.e., an intermediate language, without changing the original orientation of the print data. The display list that is generated is further converted into bitmap (BM) data by the DL-BM conversion unit 121.

In step S17, as in step S16, the PDL-DL conversion unit 119 converts the print data, i.e., page description language, into display list, i.e., an intermediate language, and the DL-BM conversion unit 121 converts the display list into bitmap data. In the conversion performed in this step, image data is rotated.

In step S19, the bitmap data resulting from the conversion in step S16 or S17 is delivered to the print unit 127, and the print unit 127 performs printing.

In step S21, the control unit 122 determines whether or not any problem occurred during printing. Here, "problem" refers to a situation where printing cannot be continued because of a sheet jam, running out of sheets, or the like. If any problem occurs, the operation proceeds to step S25. If no problem occurs, the operation proceeds to step S23.

In step S23, printing ends, normally, because no problem has occurred.

In step S25, an operation for resolving the problem that has occurred is performed. For example, in the case of a sheet jam, a user removes the jammed sheet.

In step S27, the control unit 122 determines whether or not the problem has been resolved and the state where printing can be continued has been recovered.

Figure 4:
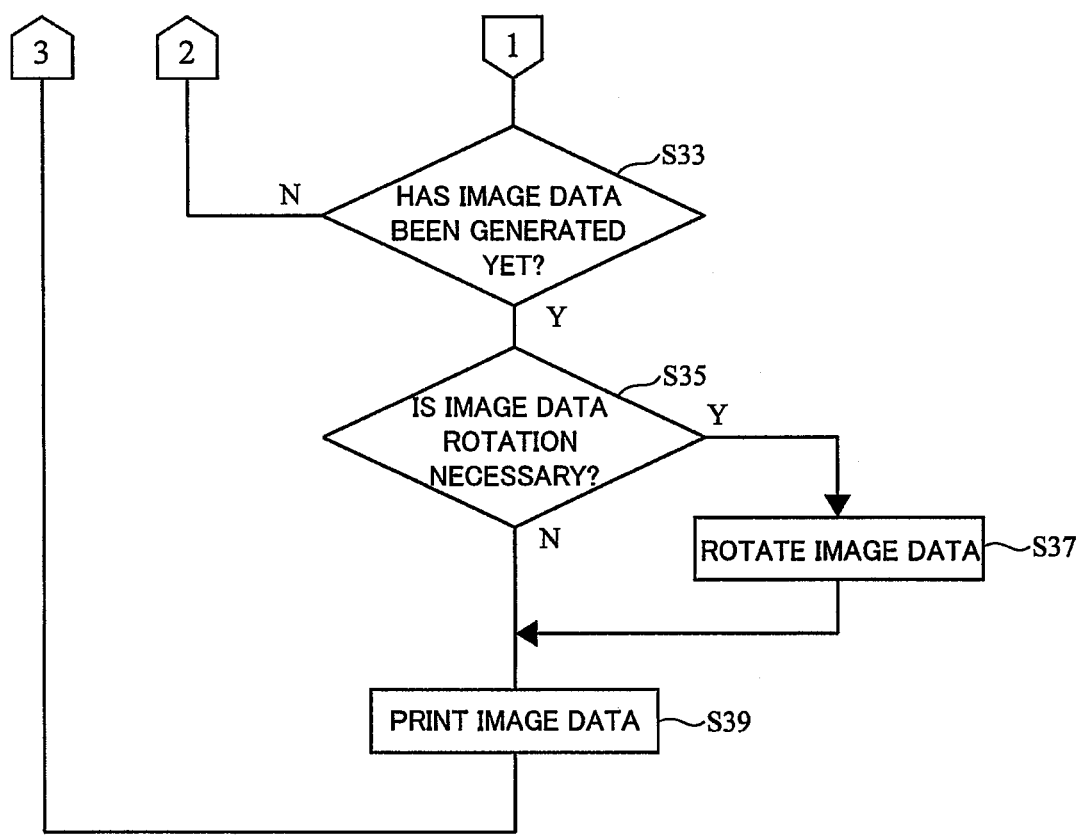
FIG. 4 is the latter part of the flowchart illustrating the operation of the image forming apparatus according to an embodiment of the present invention.

In step S29, if the state where printing can be continued has been recovered, the operation proceeds to step S33 (FIG. 4). If the state where printing can be continued is unrecoverable, the operation proceeds to step S31.

In step S31, since printing cannot be continued, the printing operation ends (that is, "abnormal end").

The flowchart continues to the latter part illustrated in FIG. 4.

In step S33, the control unit 122 determines whether or not the image data required to continue printing after the recovery has been generated. If the image data has been generated, the operation proceeds to step S35. If the image data has not been generated, the operation returns to step S13, wherein the orientation of print data and the orientation of sheets are determined again. Thus, the operation is repeated from the conversion of print data into image data.

In step S35, the determination unit 115 acquires information on the orientation of the sheets stored in the sheet cassette unit 125 from the detecting unit 123 and determines whether or not the generated image data needs to be rotated. If the image data needs to be rotated, the operation proceeds to step S37. If the image data does not need to be rotated, the operation proceeds to step S39. The determination of whether or not the image data needs to be rotated is performed by the determination unit 115 after recovery from the problem by detecting the sheet state at the time of the recovery. For example, if new sheets are supplied in an orientation 90 degrees from the original sheet orientation, after the problem is resolved, the image data is rotated in subsequent step S37.

In step S37, the image rotating unit 117 rotates the image data.

In step S39, the print unit 127 prints the image data. Subsequently, the operation returns to step S21, and the control unit 122 monitors the occurrence of any problem.

In this manner, the image forming apparatus 101 performs an optimum conversion of print data into image data by determining the orientation of sheets in the sheet cassette. If any problem occurs during printing, the problem is first resolved and the state where printing can be continued is recovered. At the time of the recovery, the orientation of sheets in the sheet cassette is detected. Then, if the image data needs to be rotated, the image data is rotated before printing is continued. Thus, printing can be continued quickly without a reconversion of print data into image data.

In an image forming apparatus according to another embodiment of the present invention, when new sheets are provided, it is determined whether or not the orientation of generated bitmap data matches the orientation of the sheets. If the orientation of the sheets does not match the orientation of the bitmap data, the mismatch is displayed as an error on the display panel unit 124, or a message requesting the placement of the sheets in the correct orientation, that is determined from the orientation of the bitmap data, is displayed on the display panel unit 124.

The image forming apparatus according to this embodiment includes the same constituents as the image forming apparatus 101 according to the previous embodiment.

The operation of the image forming apparatus 101 according to this embodiment will now be described with reference to flowcharts illustrated in FIGS. 5 and 6.

Figure 3:
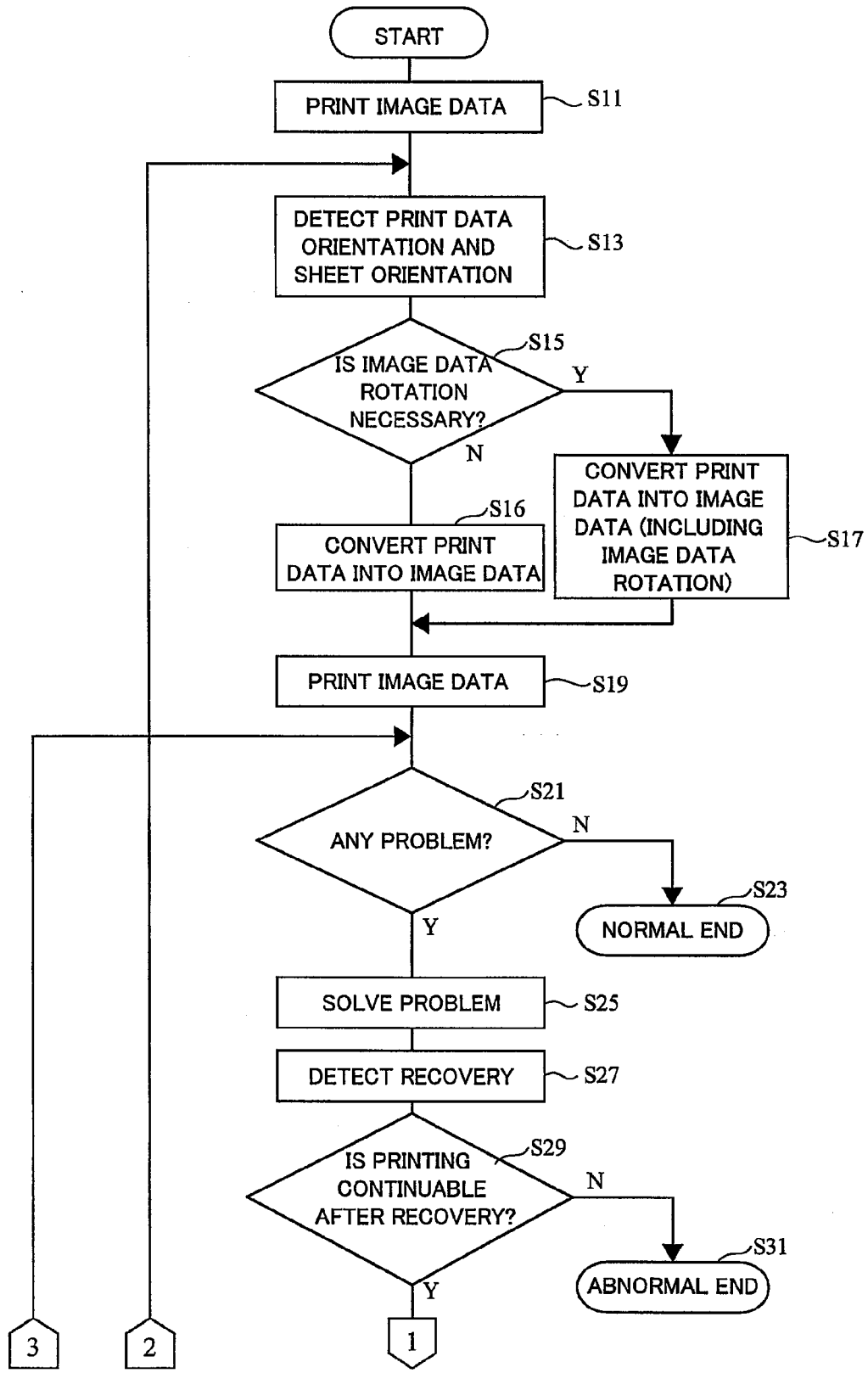
FIG. 3 is the early part of a flowchart illustrating the operation of the image forming apparatus according to an embodiment of the present invention.
Figure 5:
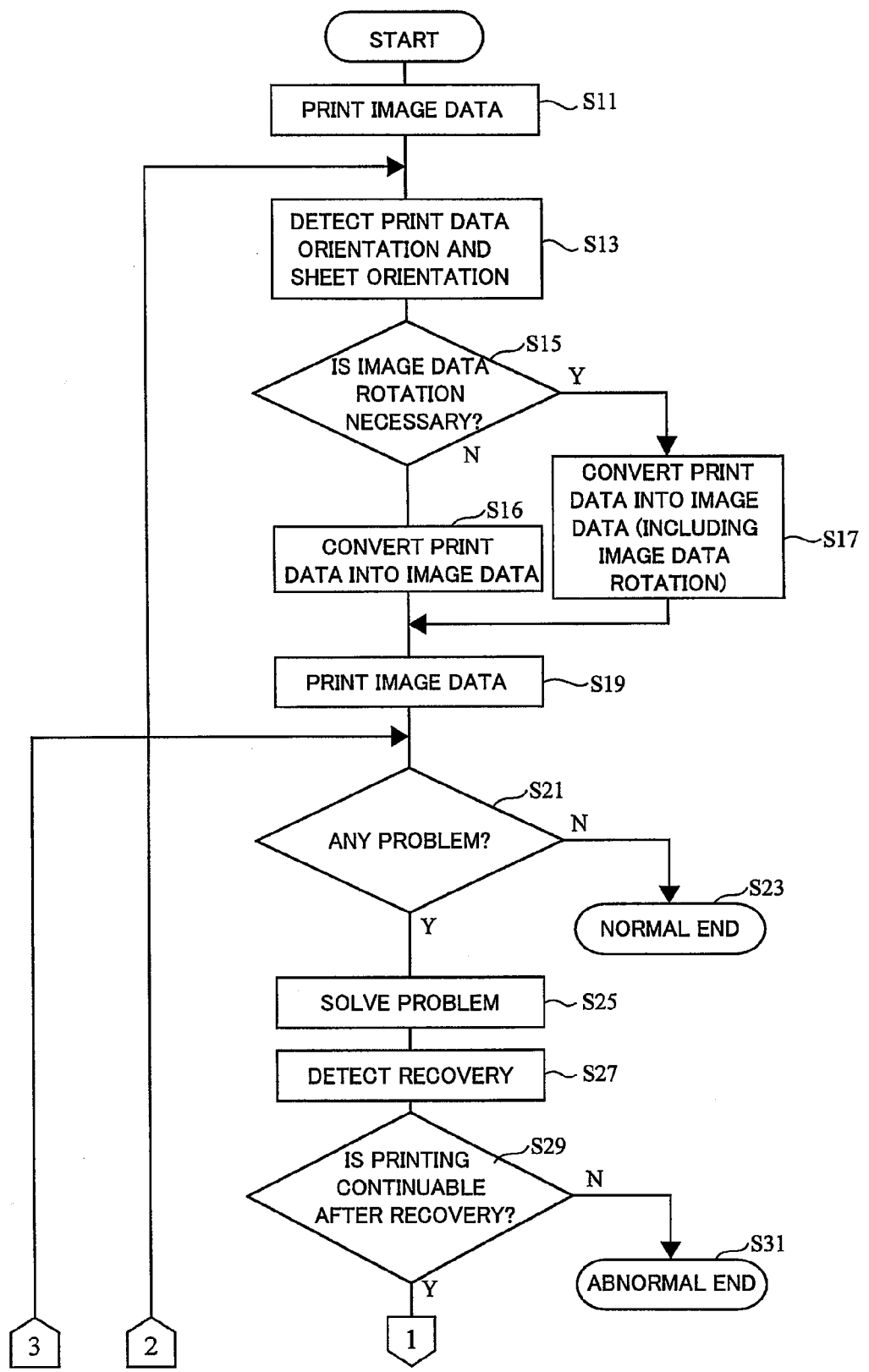
FIG. 5 is the early part of a flowchart illustrating the operation of an image forming apparatus according to another embodiment of the present invention.
Figure 6:
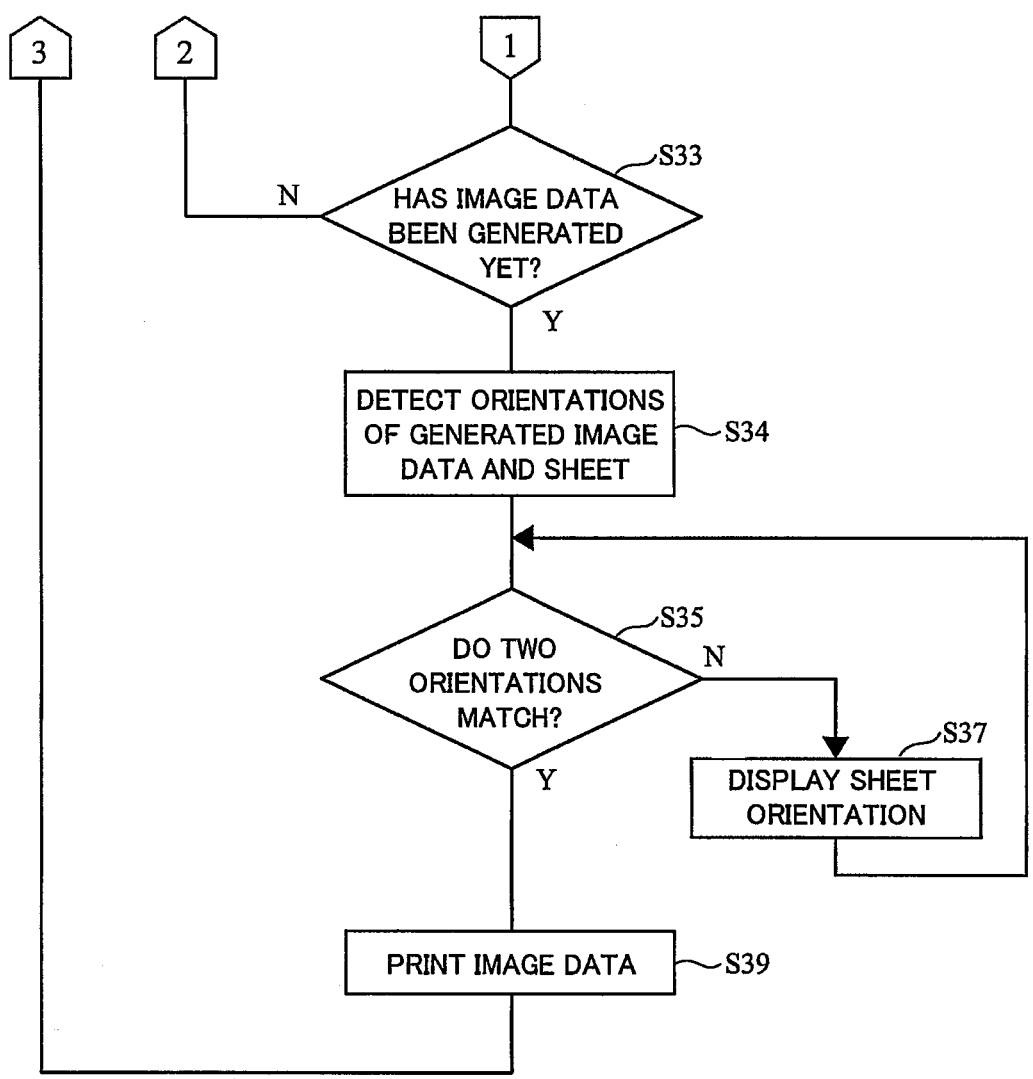
FIG. 6 is the latter part of the flowchart illustrating the operation of the image forming apparatus according to another embodiment of the present invention.

Steps S11 to S31 illustrated in FIG. 5 are the same as those in the previous embodiment illustrated in FIG. 3, and the description thereof is therefore omitted. The latter part of the flowchart illustrated in FIG. 6 will now be described.

In step S33, the control unit 122 determines whether or not the image data required for continuing the printing after recovery has been generated. If the image data has been generated, the operation proceeds to step S35. If the image data has not been generated, the operation returns to step S13, wherein the orientation of print data and the orientation of sheets are determined again. Thus, the operation is repeated from the conversion of the print data into image data.

In step S34, the orientation of the bitmap data, generated by the DL-BM conversion unit 121, and the state of the new sheets supplied from the sheet feeding unit after the problem is resolved are detected. Then, the determination unit 115 determines whether or not the orientation of the bitmap data matches the sheet orientation.

In step S35, if the result of the determination, performed in step S34, shows that the orientation of the bitmap data does not match the sheet orientation, the operation proceeds to step S37. If the result shows that the orientation of the bitmap data matches the sheet orientation, the operation proceeds to step S39.

In step S37, the sheet orientation determined when the print data is generated is not displayed, but rather the sheet orientation determined from the orientation of the bitmap data generated in step S16 or S17 is displayed on the display panel unit 124.

In step S39, the print unit 127 prints the image data. Subsequently, the operation returns to step S21, in which the control unit 122 monitors the occurrence of any problem.

In the above-described manner, the image forming apparatus 101 generates bitmap data in the correct orientation. If any problem occurs during printing, the problem is first resolved and the state where printing can be continued is recovered. At the time of the recovery, a desired sheet orientation is determined, and the determined sheet orientation is displayed on the display panel unit 124. Thus, an interruption of printing due to a mismatching of the data orientation and the sheet orientation is prevented from occurring.

In the image forming apparatus according to each of the above embodiments, high-speed image rotation is performed by the image rotating unit 117 including image rotation hardware. The present invention is not limited to such a configuration. The image rotating unit 117 does not necessarily include image rotation hardware and may perform the image rotation using software.

The embodiments describe the situation wherein single-sided printing is performed. The present invention may also be applied to double-sided printing. In double-sided printing, the angle of image rotation may differ with the side of the sheet on which printing is to be performed; because the sheet orientation may also differ depending on the side of the sheet. Even in such a situation, double-sided printing is performed page by page in the same manner as in the above embodiments.

In some applications that generate print data, the orientation of the print data is set to a specific orientation regardless of the orientation of the sheets in the sheet cassette. Even in such a situation, the determination unit 115 determines whether or not image rotation is necessary.

The sheet feeding unit has been described above focusing on the sheet cassette. The sheet feeding unit also includes the manual sheet feeding unit.

In each of the above embodiments, the angle of image rotation performed by the image rotating unit is 90 degrees or 270 degrees. The angle of rotation may alternatively be, for example, 180 degrees.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus comprising:
a feeding unit including a first sheet;
a storage unit configured to store print data to be printed onto the first sheet;
a detecting unit configured to detect an orientation of the print data and an orientation of the first sheet;
a determination unit configured to determine, whether or not the orientation of the print data matches the orientation of the first sheet;
an image data conversion unit configured to rotate the print data to match the orientation of the first sheet and convert the print data into bitmap data if the determination unit determines that the orientation of the print data does not match the orientation of the first sheet;
a print unit configured to print the converted bitmap data onto the first sheet; and
a control unit configured to determine whether or not a problem occurs during printing and whether or not printing can continue after recovery of the problem, the control unit further configured to determine whether the bitmap data was generated by converting the print data before the problem occurred,
wherein when the control unit determines that the bitmap data was not generated before the problem occurred (i) the determination unit is further configured to determine whether or not the orientation of the print data matches an orientation of a second sheet of the feeding unit, (ii) the image data conversion unit is further configured to rotate the print data to match the orientation of the second sheet and convert the print data into bitmap data if the determination unit determines that the orientation of the print data does not match the orientation of the second sheet, and (iii) the print unit is further configured to print the bitmap data onto the second sheet, and
wherein when the control unit determines that the bitmap data was generated before the problem occurred (i) the determination unit is further configured to determine whether or not the previously converted bitmap data matches the orientation of the second sheet, (ii) the image data conversion unit is further configured to rotate the previously converted bitmap data to match the orientation of the second sheet, and (iii) the print unit is further configured to print the previously converted bitmap data onto the second sheet after rotation by the image data conversion unit.

2. The image forming apparatus according to claim 1, wherein the bitmap data is generated by the image data conversion unit before the occurrence of the problem.

3. The image forming apparatus according to claim 1, wherein the image data conversion unit rotates the bitmap data using image rotation hardware.

4. The image forming apparatus according to claim 1, wherein the image data conversion unit rotates the bitmap data by an angle selected from the group consisting of 90 and 270 degrees so that the data orientation matches the sheet orientation.

5. The image forming apparatus according to claim 1, wherein, when the determination unit determines that the data orientation is a portrait orientation and the sheet orientation is a landscape orientation, the image data conversion unit rotates the bitmap data by 270 degrees.

6. The image forming apparatus according to claim 1, wherein, when the determination unit determines that the data orientation is a landscape orientation and the sheet orientation is a portrait orientation, the image data conversion unit rotates the bitmap data by 270 degrees.

7. The image forming apparatus according to claim 1, wherein the image data conversion unit converts the print data that is described in page description language into data in an intermediate language and converts the data in the intermediate language into bitmap data.

8. An image forming method comprising the steps of:
detecting an orientation of a first sheet in a sheet feeding unit;
detecting an orientation of print data;
determining, whether or not the print data needs to be rotated to match the orientation of the first sheet;
when it is determined that the print data needs to be rotated, rotating the print data to match the orientation of the first sheet and converting the print data into bitmap data;
printing or attempting to print the converted bitmap data onto the first sheet;
identifying a problem during printing;
determining whether or not printing can continue after a recovery of the problem;
determining whether or not the print data was converted into bitmap data before the problem occurred;
when it is determined that the print data was not converted into bitmap data before the problem occurred, (i) determining whether or not the print data needs to be rotated to match the orientation of a second sheet, and (ii) if it is determined that the print data needs to be rotated, rotating the print data to match the orientation of the second sheet and converting the print data into bitmap data;
when it is determined that the print data was converted into bitmap data before the problem occurred, (i) determining whether or not the previously converted bitmap data matches the orientation of the second sheet, and (ii) if it is determined that the bitmap data needs to be rotated, rotating the previously converted bitmap data to match the orientation of the second sheet; and
printing the bitmap data onto the second sheet.

* * * * *